(12) United States Patent
Marais et al.

(10) Patent No.: US 11,352,140 B2
(45) Date of Patent: Jun. 7, 2022

(54) SYSTEM FOR THE INERTIAL UNLOCKING OF A SEAT BACK

(71) Applicant: Safran Seats, Plaisir (FR)

(72) Inventors: Jean-Charles Marais, Sainte Lizaigne (FR); Olivier Lefevre, Selles sur Cher (FR); Anne Guirimand, Mereau (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 17/048,973

(22) PCT Filed: Apr. 3, 2019

(86) PCT No.: PCT/EP2019/058396
§ 371 (c)(1),
(2) Date: Oct. 19, 2020

(87) PCT Pub. No.: WO2019/201604
PCT Pub. Date: Oct. 24, 2019

(65) Prior Publication Data
US 2021/0237881 A1    Aug. 5, 2021

(30) Foreign Application Priority Data

Apr. 19, 2018 (FR) ...................................... 1853462

(51) Int. Cl.
*B64D 11/06* (2006.01)
(52) U.S. Cl.
CPC ................................ *B64D 11/0619* (2014.12)
(58) Field of Classification Search
CPC .................................................. B64D 11/0619
See application file for complete search history.

(56) References Cited

U.S. PATENT DOCUMENTS

| 5,320,308 A | 6/1994 | Bilezikjian et al. |
| 2017/0152048 A1 | 6/2017 | Schmeer et al. |

FOREIGN PATENT DOCUMENTS

| EP | 0832780 A1 | 4/1998 |
| EP | 0945302 A1 | 9/1999 |
| EP | 2610178 A2 | 7/2013 |

OTHER PUBLICATIONS

International Patent Application No. PCT/EP2019/058396, International Search Report (and English translation) and Written Opinion, dated May 17, 2019.

(Continued)

*Primary Examiner* — Anthony D Barfield
(74) *Attorney, Agent, or Firm* — Kilpatrick Townsend & Stockton LLP

(57) ABSTRACT

The invention mainly relates to a system for the inertial unlocking of a seat back, in particular of an aircraft seat, characterized in that it comprises:
  a structural element of the seat back, called a connecting rod,
  a support piece for the fixation to a structural element of said seat,
  the support piece comprising a flyweight movable in translation between:
  a locking position in which the flyweight faces a lip of the connecting rod so as to prevent the connecting rod from rotating relative to the support piece about the axis of rotation, and
  an unlocking position in which the flyweight is released from the lip of the connecting rod so as to allow the connecting rod to rotate relative to the support piece about the axis of rotation, (Continued)

the passage of the flyweight from the locking position to the unlocking position being able to be carried out under the action of a deceleration by the seat.

14 Claims, 9 Drawing Sheets

(56) References Cited

OTHER PUBLICATIONS

International Patent Application No. PCT/EP2019/058396, Written Opinion, dated May 17, 2019.
International Patent Application No. PCT/EP2019/058396, International Preliminary Reporton Patentability, dated Oct. 20, 2020.

SYSTEM FOR THE INERTIAL UNLOCKING OF A SEAT BACK

The present invention relates to a system for the inertial unlocking of a seat back. The invention finds a particularly advantageous application with the seats of aircrafts, but could also be implemented with the seats of other means of transport, such as the seats of cars.

In order to ensure a high level of safety, the aircraft seats are subjected to tests representative of an aircraft crash. Among these tests, important criteria are the trajectory and the level of impact force undergone by a passenger. In particular, the so-called HIC, acronym for head impact criterion, corresponds to a score which must not exceed a threshold value. This HIC score depends on the maximum values of the decelerations experienced by a passenger's head during an impact as well as of the time limits of a deceleration curve calculated during the test.

In order to meet this impact criterion, it is important that the seat back does not put up too much resistance to a passenger's head, which is thrown against it during the test. Furthermore, the seat back must be able to withstand important stresses for its service life as well as during a evacuation phase, insofar as it must be stably maintained in the raised position in order to prevent the passage to an emergency exit from being obstructed. The seat must also be able to withstand a static stress of up to 150 daN for serial life uses and excessive loading in the event of an evacuation.

The invention aims to meet these three constraints which may seem antagonist by proposing a system for the inertial unlocking of the back of an aircraft seat, characterized in that it comprises:
- a structural element of the seat back, called a connecting rod,
- a support piece for the fixation to a structural element of said seat,
- an axis of rotation of the connecting rod relative to the support piece,
- the support piece comprising a flyweight movable in translation between:
- a locking position in which the flyweight faces a lip of the connecting rod so as to prevent the connecting rod from rotating relative to the support piece about the axis of rotation, and
- an unlocking position in which the flyweight is released from the lip of the connecting rod so as to allow the connecting rod to rotate relative to the support piece about the axis of rotation,
- the passage of the flyweight from the locking position to the unlocking position being able to be carried out under the action of a deceleration by the seat.

The invention thus makes it possible, by allowing the rotation of the seat back in the event of a crash, to put up a defined resistance to a passenger's head which is projected forward. The level of acceleration by a passenger's head is thus limited in order to minimize the score of the HIC criterion. Furthermore, during a evacuation phase, the flyweight will return to the locked position so as to block the rotation of the seat back when the latter is moved to the raised position in order to facilitate access to the emergency exits.

According to one embodiment, a return spring urges the flyweight in its locking position when the seat is not decelerating.

According to one embodiment, the lip has a shape configured to push the flyweight towards its unlocking position when the connecting rod is moved from an extreme inclined position to a raised position.

According to one embodiment, said system comprises at least one fusible member configured to retain the seat back under its own weight during a deceleration phase.

According to one embodiment, the fusible member has the form of a pin inserted inside coincident openings in the connecting rod and the support piece.

According to one embodiment, the flyweight is mounted at the end of a shaft inserted inside a guide bush.

According to one embodiment, the guide bush is inserted inside a blind cavity.

According to one embodiment, a guide bearing is interposed radially between the shaft and an internal periphery of the guide bush.

According to one embodiment, the return spring rests by one of its ends on the guide bearing and by the other of its ends on the flyweight.

According to one embodiment, in the locking position, the flyweight rests on a bottom of the cavity.

According to one embodiment, the guide bush comprises a shoulder at the outer periphery for managing a depth of the unlocking position of the flyweight.

The object of the invention is also an aircraft seat characterized in that it comprises a seating surface, at least one seat back, and a system for the inertial unlocking of said seat back as defined above.

According to one embodiment, the inertial unlocking system is mounted between the seat back and a structural element of the seat.

According to one embodiment, the structural element of the seat is a crosshead.

Of course, the different characteristics, variants and/or embodiments of the present invention can be associated with each other in various combinations insofar as they are not mutually incompatible or exclusive.

The invention will be better understood and other characteristics and advantages will appear by reading the following detailed description, which includes embodiments given for illustrative purposes with reference to the accompanying figures, presented as way of non-limiting examples, which may serve to complete the understanding of the present invention and the description of its implementation and eventually contribute to its definition, wherein.

It should be noted that, in the figures, the structural and/or functional elements common to the different embodiments may have the same references. Thus, unless otherwise stated, such elements have identical structural properties, dimensions and materials.

Figure 1A:
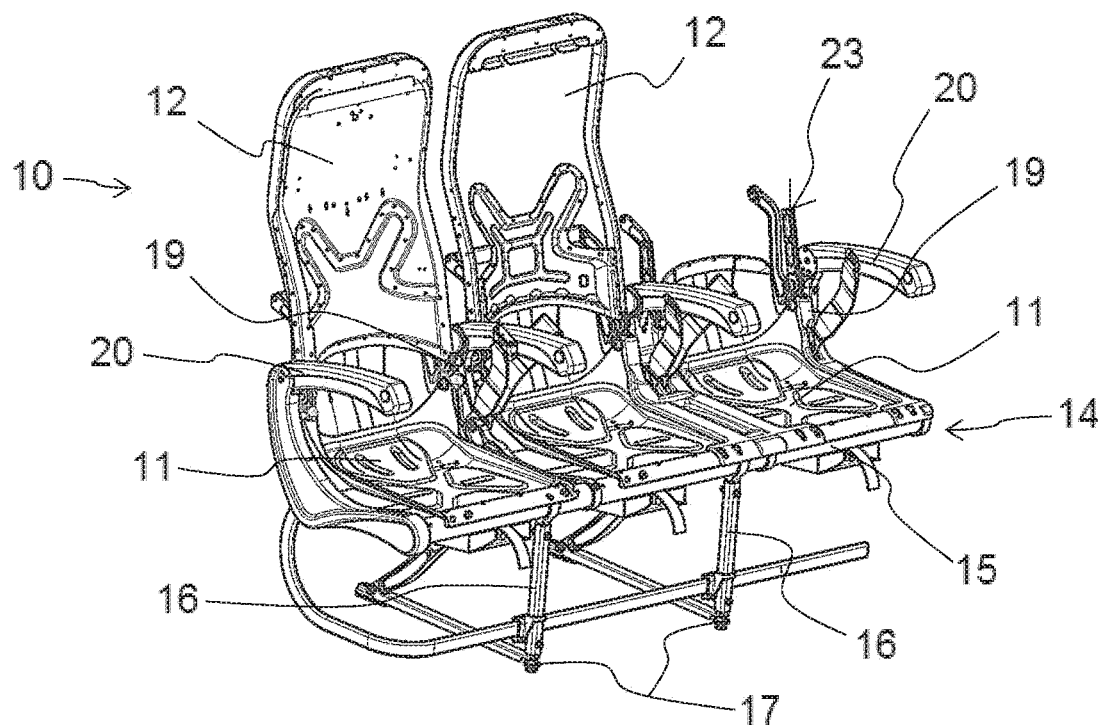
FIGS. 1a and 1b are front and back perspective views of the back of an aircraft seat incorporating an inertial unlocking system for a seat back according to the present invention.
Figure 1B:
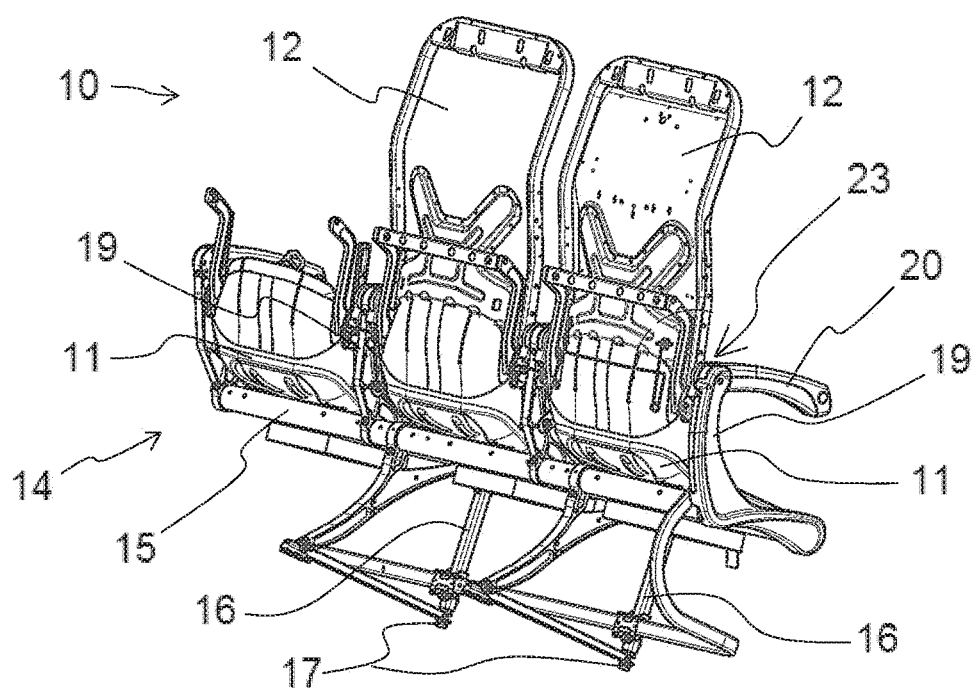

FIGS. 1a and 1b shows a seat 10 designed to be installed in an aircraft cabin. The seat 10 comprises at least one seating surface 11 and at least one seat back 12 defining a seating accommodation. In this case, the seat 10 has three seating accommodations. This number of seating accommodations can of course be adapted as needed.

The seating surfaces 11 and the seat backs 12 are mounted on a seat structure 14. The seat structure 14 comprises transversal reinforcing bars 15 for the seating surface 11. Support legs 16 are intended to support the sitting surface 11. These support legs 16 are provided with bolts 17 for ensuring the clamping fixation of the seat 10 to rails (not shown) arranged on the floor of the aircraft cabin.

Crossheads 19 bearing armrest 20 are arranged between the seating surfaces 11 as well as at the ends of the seat 10. The armrests 20 may be mounted mobile in rotation or fixed with respect to the crossheads 19.

Figure 2:
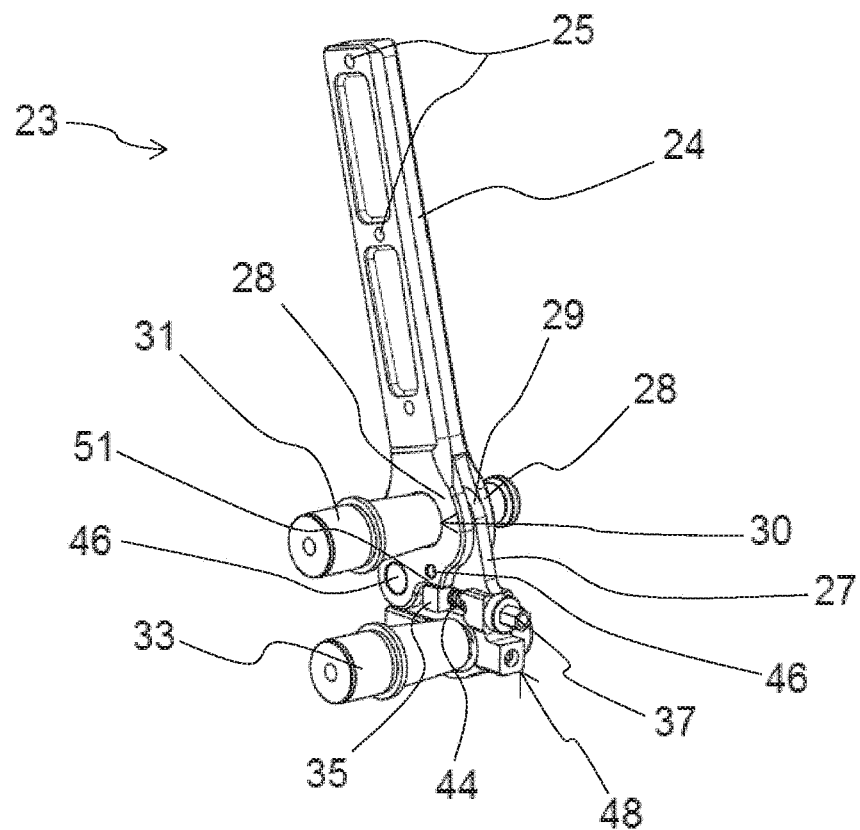
FIG. 2 is a detailed perspective view of an inertial unlocking system for seat back according to the present invention.

An inertial unlocking system 23 for a seat back 12 is interposed between a seat back 12 and a structural element of the seat 10. As can be seen in FIG. 2, this system 23 comprises a structural element 24 of the seat back, called a connecting rod 24. The connected rod 24 of elongate shape may be fixed by means of fastening organs, such as screws or rivets, inserted into fixing holes 25 formed along its length. In addition, a support piece 27 is intended to be fixed to the structural element of the seat 10, in this case a crosshead 19.

More specifically, the connecting rod 24 comprises two legs 28 arranged on either side of a projecting portion 29 of the support piece 27. The legs 28 and the projecting portion 29 are provided with an through opening 30 for the passage of an axis of rotation 31 of the connecting rod 24 relative to the support piece 27. The axis of rotation 31 is intended to be fixed to the crosshead 19. A second axis 33 through the support part 27 ensures the fixation of the seating surface 11 to the crosshead 19.

The support piece 27 comprises a flyweight 35 mounted at the end of a shaft 36 inserted inside a guide bush 37. The flyweight 35 may be fixed to the shaft 36, for example by force fitting or by screwing or any other fixing means suitable for the application.

The guide bush 37 and the shaft 36 are arranged inside a blind cavity 40. The guide bush 37 comprises a shoulder 41 at the outer periphery for managing a depth of the unlocking position of the flyweight 35.

A guide bearing 42, such as a bearing bush, is radially interposed between the shaft 36 and an inner periphery of the guide bush 37. The guide bearing 42 is made of a material with a low coefficient of friction, for example 'iglidur' (registered trademark), in order to facilitate the translational movement of the shaft 36.

A return spring 44 arranged around the shaft 36 has an end resting on the flyweight 35. The other end inserted inside the guide bush 37 rests on the guide bearing 42. The bearing 42 rests on an internal shoulder 45 of the guide bush 37 defined by a difference in diameter of the internal periphery of the guide bush 37.

In addition, at least one fusible member 46 is configured to retain the seat back 12 under its own weight during a deceleration phase. In the example shown, two fusible members 46 are used which are intended to work under a shearing action when tilting the seat 10. The fusible members 46 have the form of massive cylindrical pins inserted inside coincident openings in the connecting rod 24 and the support piece 27. The pins 46 are advantageously made of a plastic material. The shear resistance of the pins 46 depends in particular on the weight of the seat back 12 and on the distance between the seat comprising the seat back 12 and the rear seat which receives the passenger whose head will collide with the seat back 12. In an exemplary embodiment, the pins 46 have a shear resistance between 5,000 and 30,000 Newtons.

It is also possible to use an adjustment system 48 for the inclination of the seat back 12. In this case, this adjustment system 48 comprises two adjustment screws 49 making it possible to adjust the position of the axis 33 inside an oblong hole 50 and therefore the inclination of the seat back 12 in the initial position.

The operation of the inertial unlocking system 23 is described below with reference to FIGS. 3a to 9c.

Figure 3A:
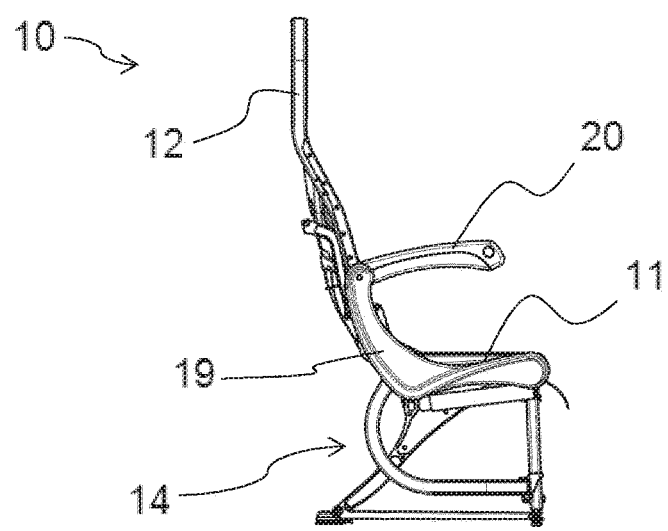
FIGS. 3a to 9c are views of the seat as well as side and cutaway views illustrating the operation of the inertial unlocking system for a seat back according to the present invention.
Figure 3B:
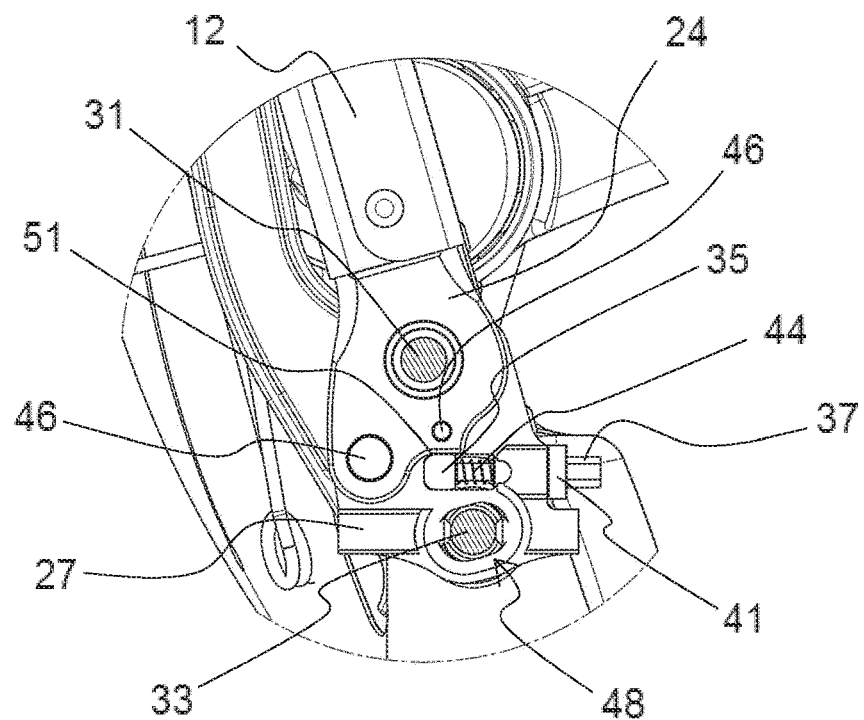
Figure 3C:
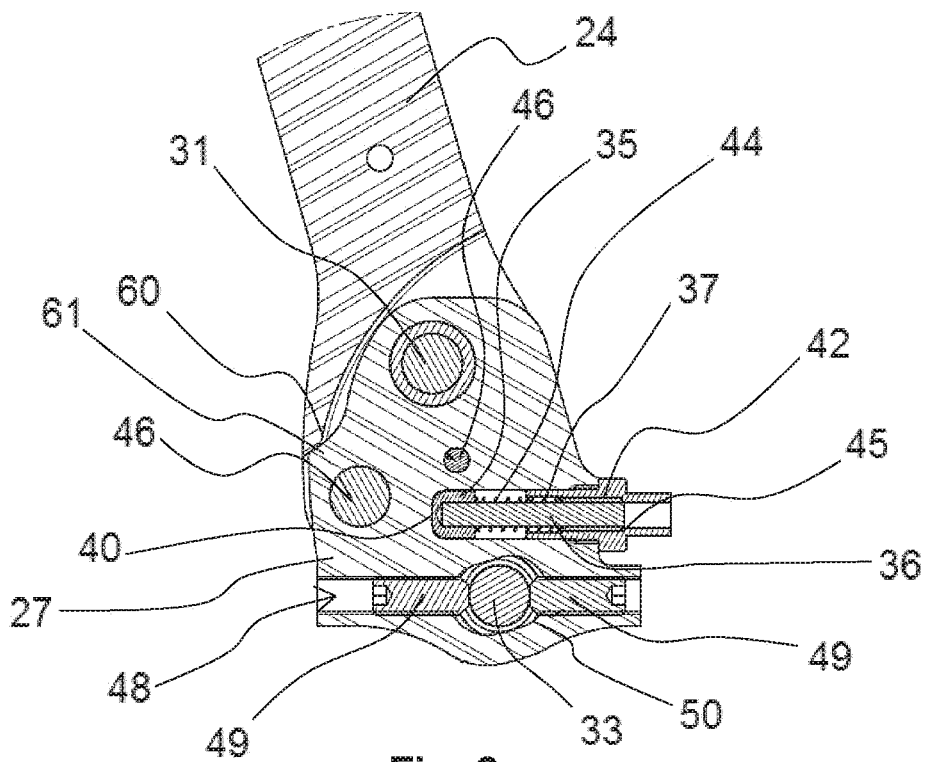

As illustrated in FIGS. 3a to 3c, when the seat 10 is not subjected to any force or undergoes an acceleration, the return spring 44 urges the flyweight 35 into a locking position. In this locking position, the flyweight 35 faces a lip 51 of the connecting rod 24 so as to prevent the connecting rod 24 from rotating relative to the support piece 27 about the axis of rotation 31. To this end, the flyweight projects transversally with respect to the cavity 40 formed in the thickness so as to be positioned in a facing relationship with the lip 51. The flyweight 35 rests on the bottom of the blind cavity 40. The connecting rod 24 and the seat back 12 are in the raised position.

In a case of static operation, when a force is applied to the seat back 24 from the rear to the front, the plastic pins 46 deforms, so that the lip 51 rests on the flyweight 35. The lip 51 thus blocks the rotation of the seat back 24 which will be able to withstand significant forces for serial life uses and excessive loading in the event of evacuation.

In a static operating case, when a force is applied to the seat back from the front to the rear, a shoulder 60 of the connecting rod 24 bears against a corresponding contact zone 61 formed in the support piece 27, as shown in FIG. 3c. The rotational locking of the seat back 24 is effective for withstanding significant stresses for serial life uses and excessive loading in the event of an evacuation.

Figure 4A:
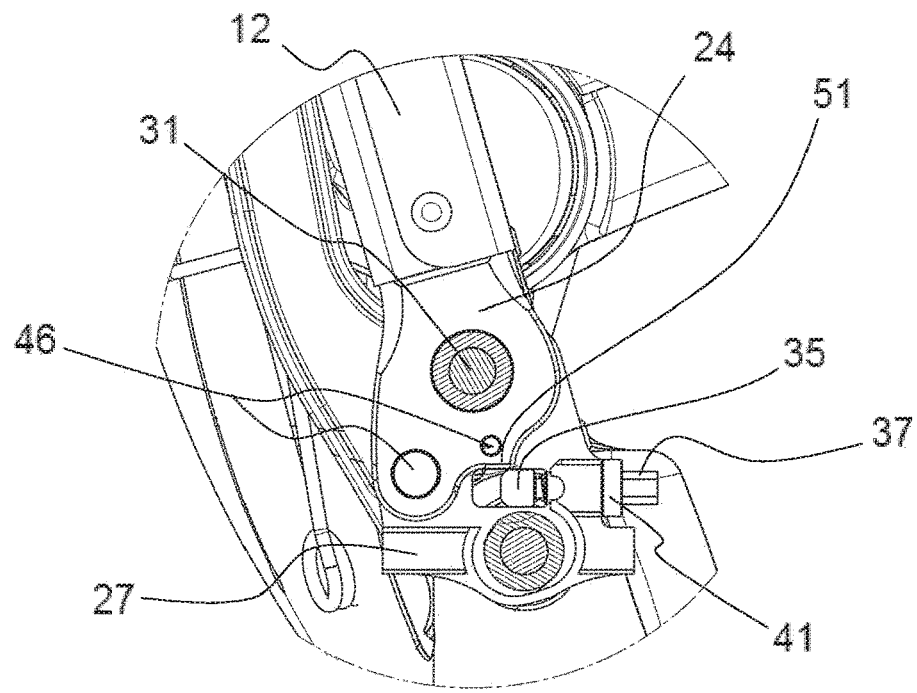
Figure 4B:
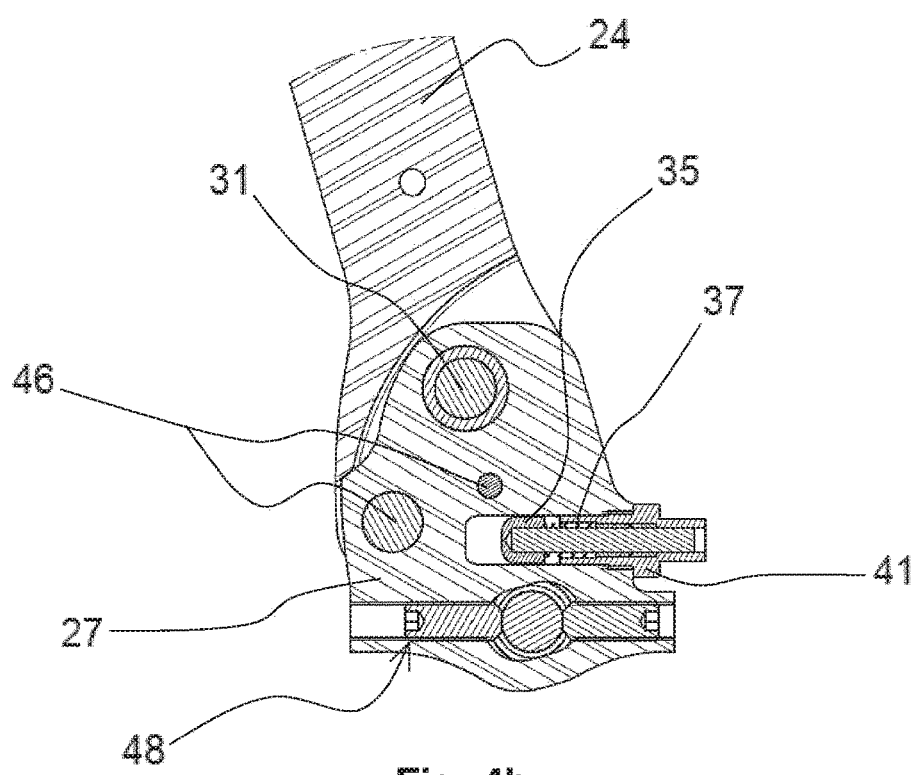

A case of dynamic operation of the inertial unlocking system 23 for the seat back is explained below. As illustrated in FIGS. 4a and 4b, under the effect of a deceleration, the flyweight 35 begins to compress the spring due to its translation movement inside the cavity 40. Furthermore, the rotation of the connecting rod 24 is blocked by the fusible pins 46, so that the lip 51 is not in contact with the flyweight 35 and therefore does not block its translational movement.

Figure 5A:
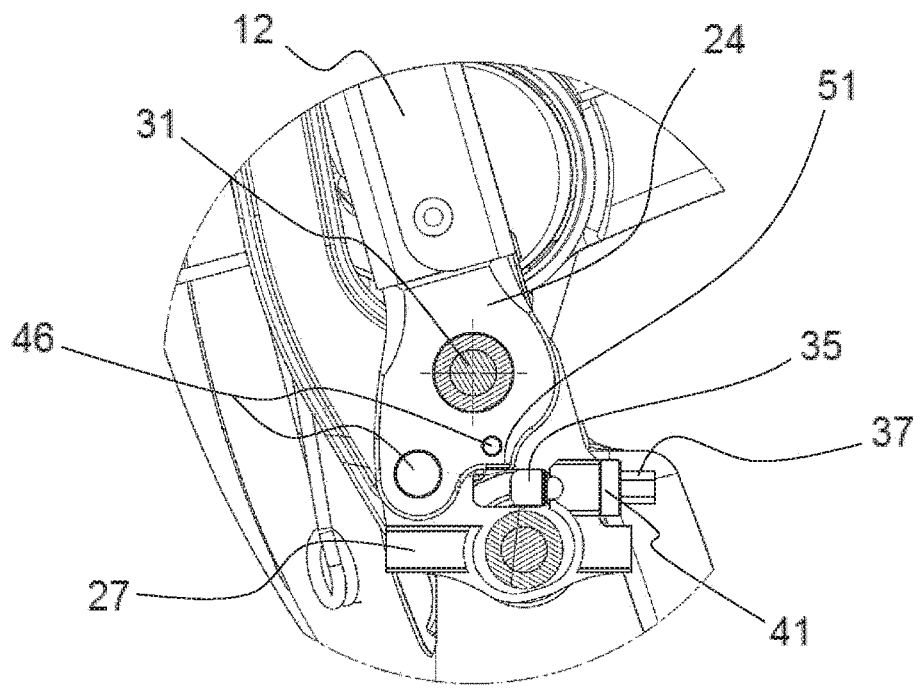
Figure 5B:
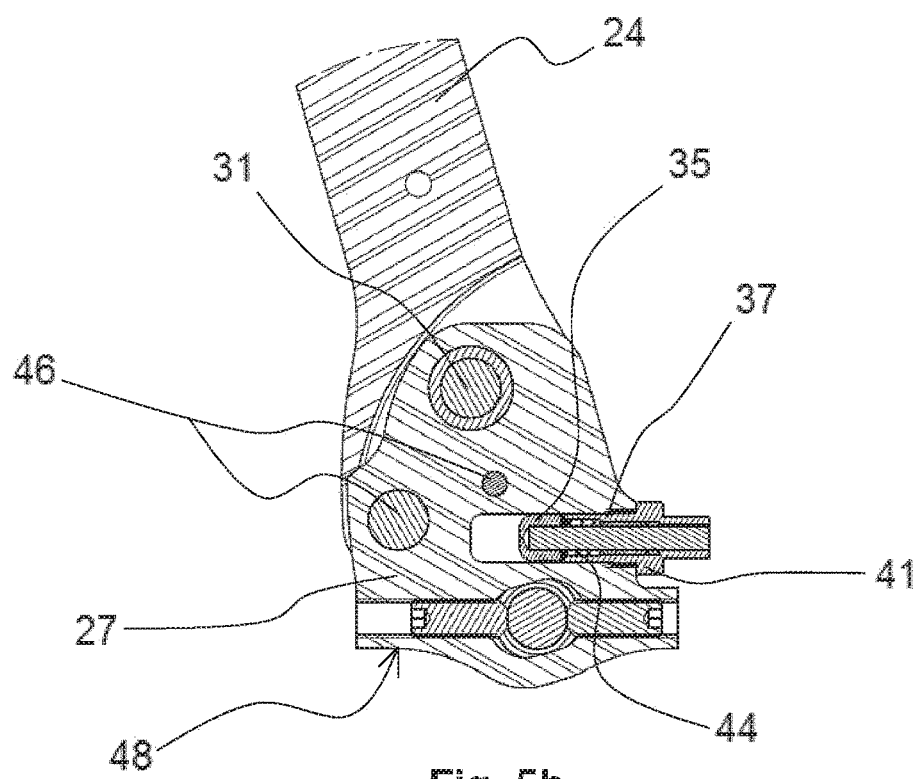

As illustrated in FIGS. 5a and 5b, the flyweight 35 passes into an unlocking position in which the flyweight 35 is released from the lip 51 of the connecting rod 24. The flyweight 35 then reaches its maximum travel and rests on one end of the guide bush 37. The rotation of the connecting rod 24 is still blocked by the fusible pins 46.

Figure 6A:
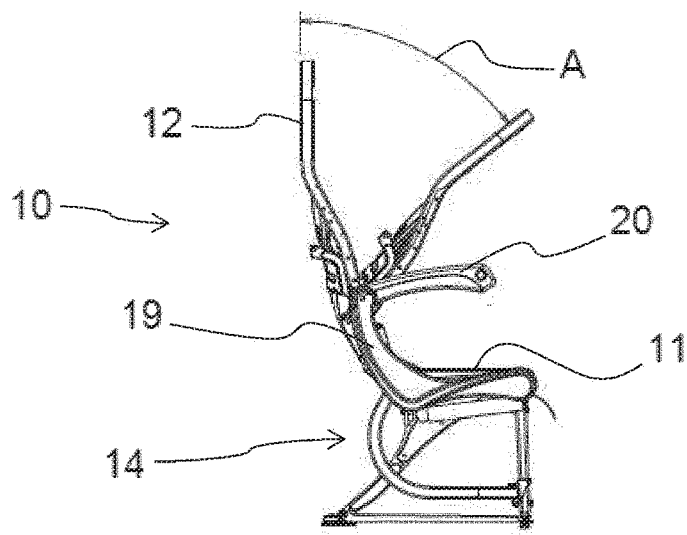
Figure 6B:
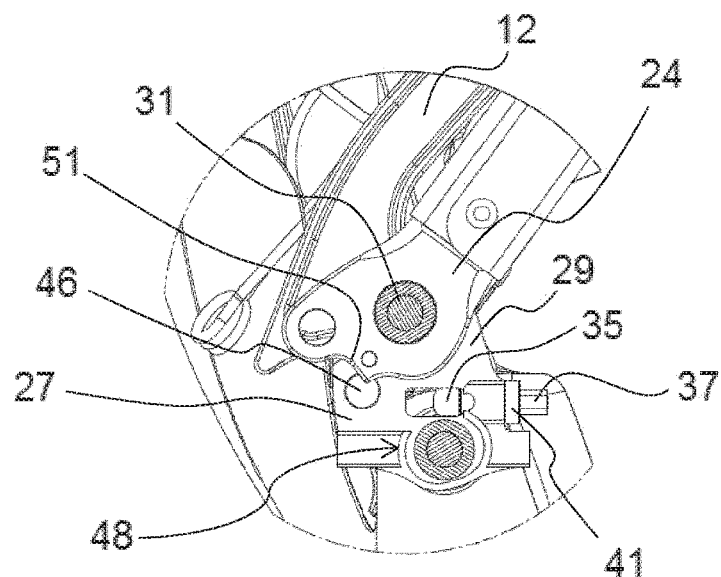
Figure 6C:
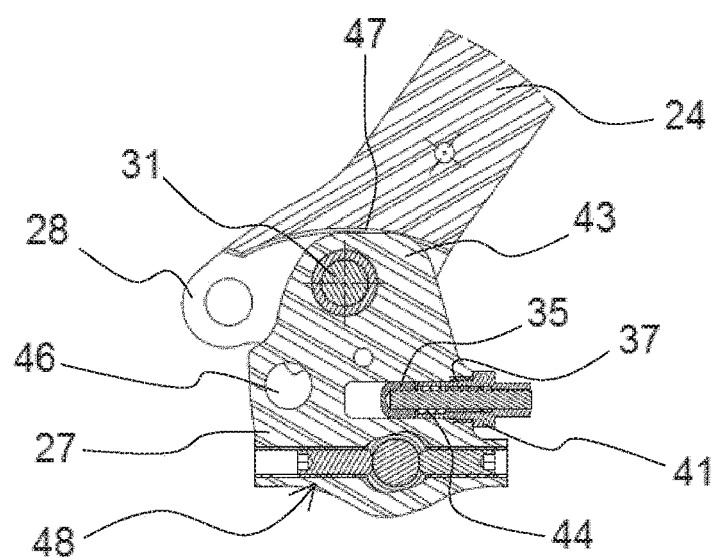

As illustrated in FIGS. 6a to 6c, when an impact of a passenger's head onto the seat back 12, the transmission of the force from the top to the bottom of the seat back 12 has the effect of breaking the fusible pins 46, insofar as the latter are dimensioned to retain only the seat back 12 under its own weight.

The seat back 12 can then rotate forward due to the release of the flyweight 35 from the lip 51 of the connecting rod 24. Indeed, the unlocked position of the flyweight 35 allows the connecting rod 24 to rotate relative to the support piece 27 about the axis of rotation 31. At the end of the movement, the seat back 12 and the connecting rod 24 are in an extreme inclined position.

The angle of travel A of the seat back 12 is defined by a geometry of the upper edge 43 of the support piece 27 and of the curved bottom 47 of the space between the two legs 28, as shown in FIG. 6c. The angle of travel A is for example between 40 and 60 degrees.

Figure 7A:
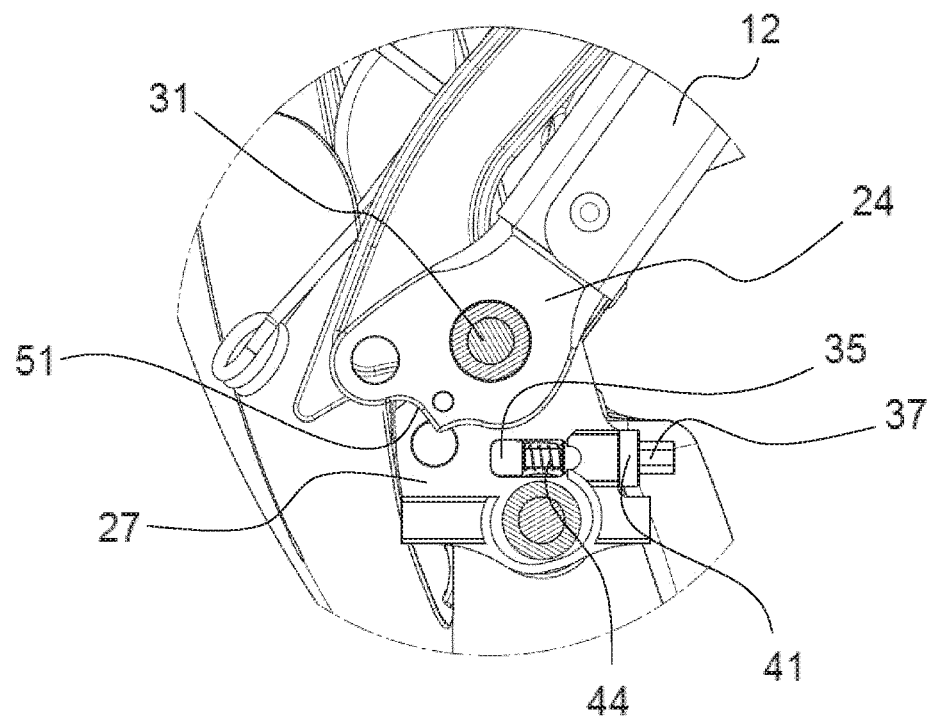
Figure 7B:
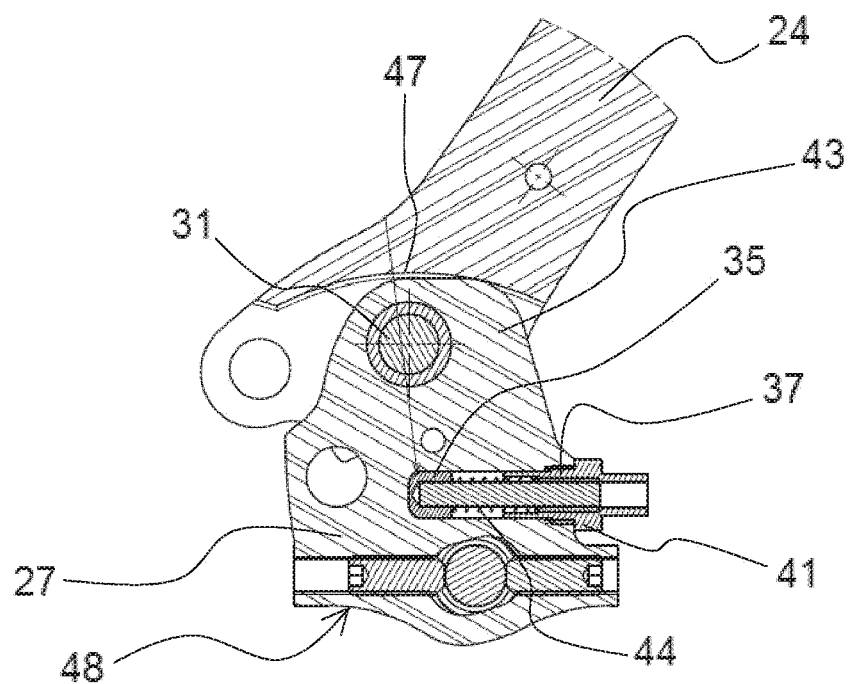

As shown in FIGS. 7a and 7b, when the deceleration period is completed, the spring 44 pushes the flyweight 35 back into the locking position.

Figure 8A:
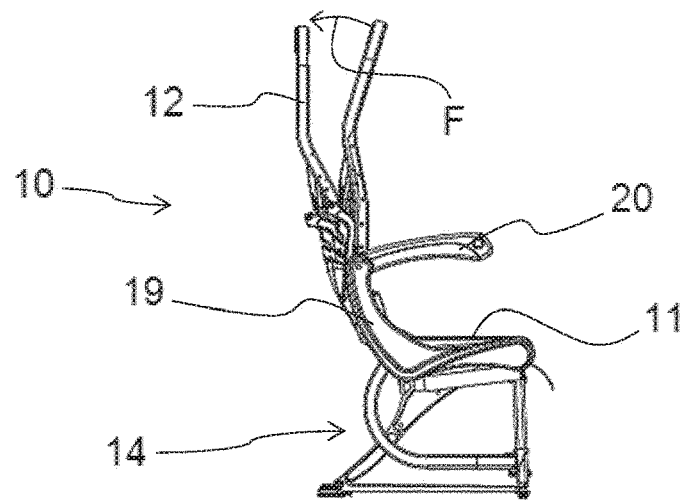
Figure 8B:
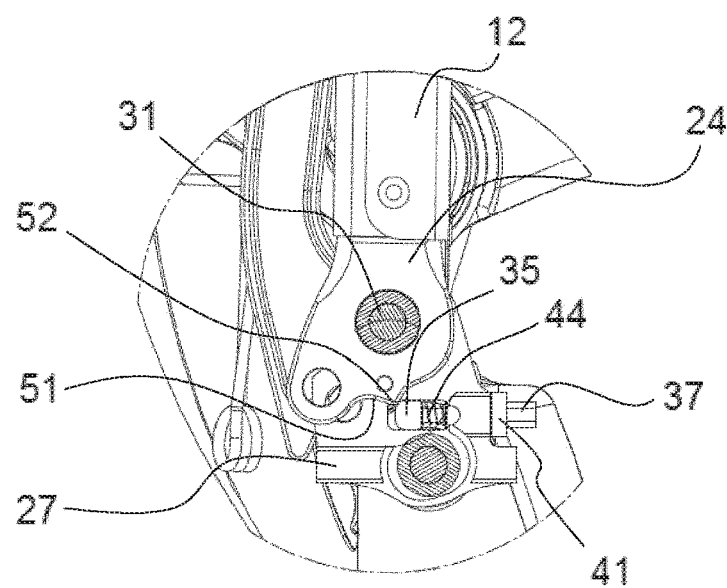
Figure 8C:
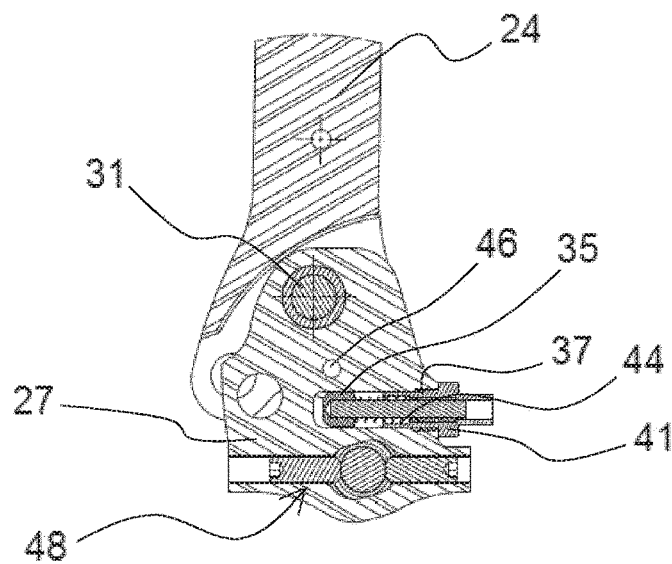

As illustrated in FIGS. 8a to 8c, when the seat back 12 and thus the connecting rod 24 is moved according to the arrow F, from the extreme inclined position to a raised position, the lip 51 has a shape 52, including a wedge, configured to push the flyweight 35 back to its unlocked position by forcing the spring 44.

Figure 9A:
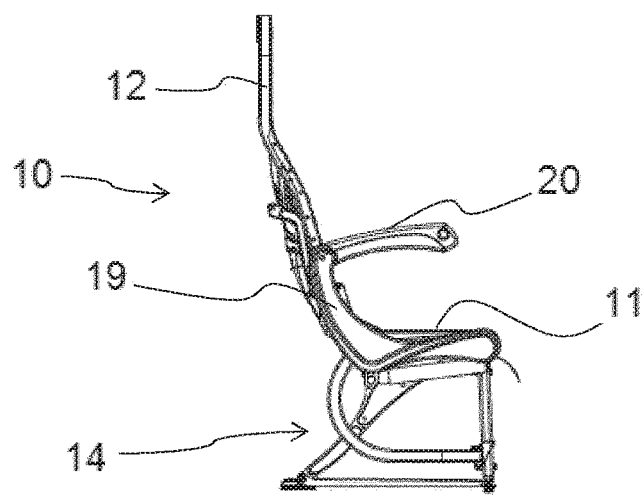
Figure 9B:
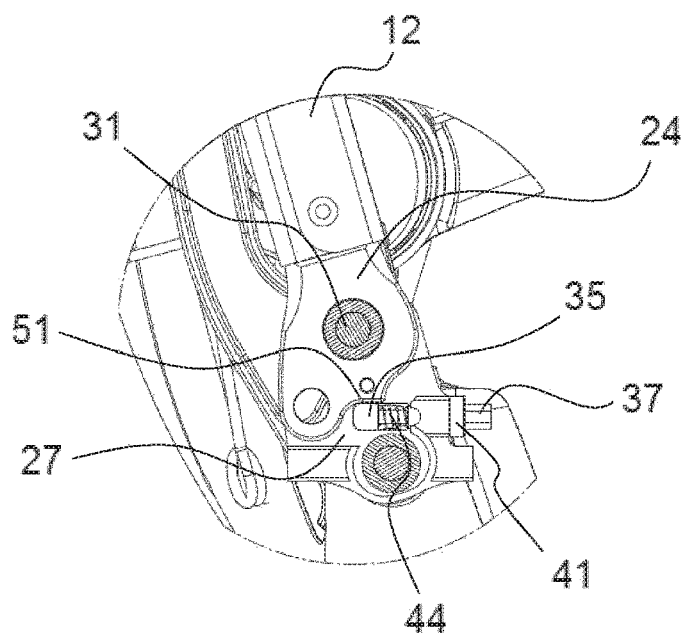
Figure 9C:
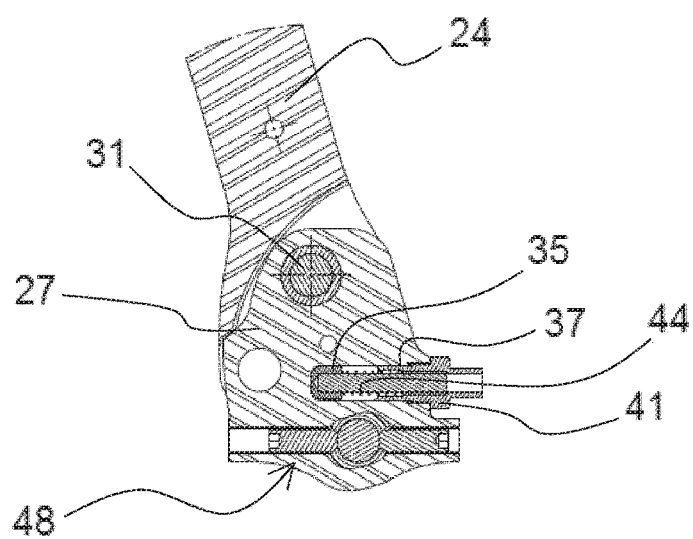

As illustrated in FIGS. 9a to 9c, once the seat back 12 is in the raised position, the wedge is released from the flyweight 35 by passing over the flyweight 35. The spring 44 then pushes the flyweight 35 back into the locked position. The seat back 12 is then locked in rotation and can withstand static forces. This ensures that the seat back 12 will be kept in the raised position and will not hinder access to the emergency exits.

In a degraded operation of the inertial unlocking system for a seat back 23, it would be possible to eliminate the return spring 44 and/or the fusible pins 46.

Obviously, the invention is not limited to the embodiments described above and provided solely by way of example. It encompasses various modifications, alternative forms and other variants which a person skilled in the art may envisage in the context of the present invention and in particular any combination of the various operating modes described above may be taken separately or in combination.

The invention claimed is:

1. A system for inertial unlocking of a seat back of a seat, the system comprising:
    a connecting rod of the seat back,
    a support piece for fixation to the connecting rod of said seat back,
    an axis of rotation of the connecting rod relative to the support piece,
    the support piece comprising a flyweight movable in translation between:
    a locking position in which the flyweight faces a lip of the connecting rod so as to prevent the connecting rod from rotating relative to the support piece about the axis of rotation, and
    an unlocking position in which the flyweight is released from the lip of the connecting rod so as to allow the connecting rod to rotate relative to the support piece about the axis of rotation,
    the passage of the flyweight from the locking position to the unlocking position being able to be carried out under an action of a deceleration by the seat.

2. The system according to claim 1, wherein a return spring urges the flyweight into its locking position when the seat is not decelerating.

3. The system according to claim 2, wherein the return spring rests by one of its ends on a guide bearing and by the other of its ends on the flyweight.

4. The system according to claim 1, wherein the lip has a shape configured to push the flyweight towards its unlocking position when the connecting rod is moved from an extreme inclined position to a raised position.

5. The system according to claim 1, wherein the system further comprises at least one fusible member configured to retain the seat back under its own weight during a deceleration phase.

6. The system according to claim 5, wherein the fusible member comprises a pin inserted inside coincident openings in the connecting rod and the support piece.

7. The system according to claim 1, wherein the flyweight is mounted at an end of a shaft inserted inside a guide bush.

8. The system according to claim 7, wherein the guide bush is inserted inside a blind cavity.

9. The system according to claim 8, wherein, in the locking position, the flyweight rests on a bottom of the blind cavity.

10. The system according to claim 8, wherein the guide bush comprises a shoulder for managing a depth of the unlocking position of the flyweight.

11. The system according to claim 7, wherein a guide bearing is interposed radially between the shaft and an internal periphery of the guide bush.

12. An aircraft seat comprising a seating surface, at least one seat back, and a system for inertial unlocking of said seat back according to claim 1.

13. The aircraft seat according to claim 12, wherein the inertial unlocking system is mounted between the seat back and a structural element of the seat.

14. The aircraft seat according to claim 13, wherein the structural element of the seat is a crosshead.

* * * * *